US012620130B2

(12) United States Patent (10) Patent No.: US 12,620,130 B2
Luo et al. (45) Date of Patent: May 5, 2026

(54) LOCATING METHOD AND APPARATUS FOR ROBOT, AND STORAGE MEDIUM

(71) Applicant: Beijing Roborock Innovation Technology Co., Ltd., Beijing (CN)

(72) Inventors: Han Luo, Beijing (CN); Jingying Cao, Beijing (CN); Ronglei Tong, Beijing (CN); Lina Cao, Beijing (CN); Jun Chen, Beijing (CN); Jiayao Ma, Beijing (CN); Shuangshuang Wang, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 491 days.

(21) Appl. No.: 18/043,607

(22) PCT Filed: Apr. 8, 2021

(86) PCT No.: PCT/CN2021/085932
§ 371 (c)(1),
(2) Date: Mar. 1, 2023

(87) PCT Pub. No.: WO2022/048153
PCT Pub. Date: Mar. 10, 2022

(65) Prior Publication Data
US 2024/0029298 A1 Jan. 25, 2024

(30) Foreign Application Priority Data
Sep. 1, 2020 (CN) ......................... 202010906553.9

(51) Int. Cl.
*G06T 7/73* (2017.01)
*A47L 11/40* (2006.01)
(Continued)

(52) U.S. Cl.
CPC ............. *G06T 7/74* (2017.01); *A47L 11/4011* (2013.01); *G05D 1/0246* (2013.01);
(Continued)

(58) Field of Classification Search
CPC . G06T 7/74; G06T 2207/30244; G06V 10/70; A47L 11/4011; A47L 2201/04; G05D 1/0246; G05D 1/0274
See application file for complete search history.

(56) References Cited

U.S. PATENT DOCUMENTS 9,183,631 B2 * 11/2015 Taguchi .................... G06T 7/75
2016/0295134 A1 * 10/2016 Beall ...................... G06T 7/0004
(Continued)

FOREIGN PATENT DOCUMENTS

CA 2968561 A1 * 4/2014 ............. G01C 21/20
CN 109431381 A * 3/2019 ............. G06V 20/10
(Continued)

OTHER PUBLICATIONS

Extended European Search Report of application No. 21863223.0 dated Sep. 6, 2024.
(Continued)

*Primary Examiner* — Pinalben Patel
(74) *Attorney, Agent, or Firm* — Calfee, Halter & Griswold LLP

(57) ABSTRACT

A locating method and apparatus for a robot, and a computer-readable storage medium. The locating method includes: determining current possible pose information of the robot according to current ranging data collected by a ranging unit; determining, according to first current image data collected by an image collection unit, first historical image data matching with the first current image data, the first historical image data being collected by the image collection unit at a historical moment; obtaining first his-
(Continued)

torical pose information of the robot at a moment when the first historical image data is collected; and in response to quantity of the current possible pose information being at least two pieces, matching the first historical pose information with each piece of the current possible pose information, and using matched current possible pose information as current target pose information.

20 Claims, 5 Drawing Sheets

(51) Int. Cl.
*G05D 1/00* (2024.01)
*G06V 10/70* (2022.01)

(52) U.S. Cl.
CPC ........... *G05D 1/0274* (2013.01); *G06V 10/70* (2022.01); *A47L 2201/04* (2013.01); *G06T 2207/30244* (2013.01)

(56) References Cited

U.S. PATENT DOCUMENTS

| | | | | |
|---|---|---|---|---|
| 2018/0005407 A1* | 1/2018 | Browning | .............. | G05D 1/024 |
| 2018/0075652 A1* | 3/2018 | Kim | ........................ | G06T 17/00 |
| 2018/0297207 A1 | 10/2018 | Huang et al. | | |
| 2022/0026920 A1* | 1/2022 | Ebrahimi Afrouzi | .... | G06N 7/01 |

FOREIGN PATENT DOCUMENTS

| | | |
|---|---|---|
| CN | 111429574 A | 7/2020 |
| CN | 111596298 A | 8/2020 |
| CN | 112212853 A | 1/2021 |
| TW | 201024784 A | 7/2010 |
| WO | 2020241930 A1 | 12/2020 |

OTHER PUBLICATIONS

International Search Report from PCT/CN2021/085932 dated Jul. 14, 2021.

* cited by examiner

LOCATING METHOD AND APPARATUS FOR ROBOT, AND STORAGE MEDIUM

CROSS-REFERENCE TO RELATED APPLICATIONS

The present disclosure is the U.S. national phase application of International Application No. PCT/CN2021/085932 filed on Apr. 8, 2021, which claims priority to Chinese Patent Application No. 202010906553.9, filed on Sep. 1, 2020, the content of which are incorporated herein by reference in their entireties for all purposes.

TECHNICAL FIELD

The present disclosure relates to the field of robot technology, and in particular, to a locating method and apparatus for a robot, and a storage medium.

BACKGROUND

With the development of technology, a variety of robots with an autonomous moving function have emerged, such as an automatic cleaning device like an automatic sweeping robot or an automatic mopping robot. The automatic cleaning device can automatically perform a cleaning operation by actively sensing surrounding environment. For example, in the related technology, simultaneous location and mapping (SLAM) is used to construct a map of the environment needing to be cleaned currently, and the cleaning operation is performed according to the map constructed.

SUMMARY

The present disclosure provides a locating method and apparatus for a robot, and a computer-readable storage medium.

According to one aspect of embodiments of the present disclosure, a locating method for a robot is provided; the robot is equipped with an image collection unit and a ranging unit, the method including: determining, according to current ranging data collected by the ranging unit and current orientation information of the robot, current possible pose information of the robot; determining, according to first current image data collected by the image collection unit, first historical image data that matches with the first current image data, wherein the first historical image data is collected by the image collection unit at a historical moment; obtaining first historical pose information of the robot at a moment when the first historical image data is collected; and matching, in response to quantity of the current possible pose information being at least two pieces, the first historical pose information with each piece of the current possible pose information, and using matched current possible pose information as current target pose information.

According to another aspect of embodiments of the present disclosure, a locating apparatus for a robot is provided; the robot is equipped with an image collection unit and a ranging unit; the locating apparatus including:

an image data determination unit configured to determine, according to current image data collected by the image collection unit, historical image data that matches with the current image data, wherein the historical image data is collected by the image collection unit at a historical moment;

a pose obtaining unit configured to obtain historical pose information of the robot at a moment when the historical image data is collected;

a pose determination unit configured to determine, according to current ranging data collected by the ranging unit and current orientation information of the robot, current possible pose information of the robot;

a determination unit configured to determine quantity of the current possible pose information; and a matching unit configured to: match the historical pose information with each piece of the current possible pose information, and use matched current possible pose information as current target pose information.

According to another aspect of embodiments of the present disclosure, a robot is provided, the robot is equipped with an image collection unit and a ranging unit; the robot including:

a processor; and a memory configured to store executable instructions for the processor;

and the processor executes the executable instructions to implement the method according to any of foregoing embodiments.

According to another aspect of embodiments of the present disclosure, a computer-readable storage medium having computer instructions stored thereon is provided, which when executed by a processor, cause the processor to implement the method according to any of foregoing embodiments.

It should be understood that the previous general description and the following detailed description are merely exemplary and explanatory, and are not intended to limit the present disclosure.

BRIEF DESCRIPTION OF DRAWINGS

The accompanying drawings, which are incorporated in and constitute a part of the present specification, illustrate embodiments consistent with the present disclosure and serve, together with the specification, to explain principles of the present disclosure.

DESCRIPTION OF EMBODIMENTS

Example embodiments are herein described in detail, with examples of which shown in the accompanying drawings. When the following descriptions refer to the accompanying drawings, the same number in different accompanying drawings represent same or similar element, unless otherwise specified. Implementations described in the following example embodiments do not represent all implementations consistent with the present disclosure. Instead, they are only examples of the apparatus and the method consistent with some aspects of the present disclosure that are described in detail in the appended claims.

Terms used in the present disclosure are merely for illustrating specific implementations, and are not intended to limit the present disclosure. The terms "a", "an" and "the" of singular forms used in the present disclosure and the appended claims are also intended to include plural forms, unless otherwise specified in the context clearly. It should be further understood that the term "and/or" used in the present disclosure indicates and includes any or all possible combinations of one or more associated listed items.

It will be understood that although terms "first", "second", "third", etc. may be used in the present disclosure to describe various types of information, the information should not be limited to these terms. The terms are merely used to distinguish the information of the same type. For example, the first information can be referred to as the second information, and similarly, the second information can also be referred to as the first information, without departing from the scope of the present disclosure. The word "if" used herein can be, for example, explained as "while", "when", or "in response to determination that", depending on the context.

In the related technology, a sweeping robot is taken as an example. A laser distance sensor (LDS) is usually arranged on the sweeping robot to perform locating in a cleaning process by using an SLAM algorithm. However, the locating performed by using the LDS is relatively low in locating accuracy, and when the sweeping robot is hijacked, there may be a case in which a hijacking event cannot be detected by using the LDS, which will be described in the following with reference to FIG. 1.

Figure 1:
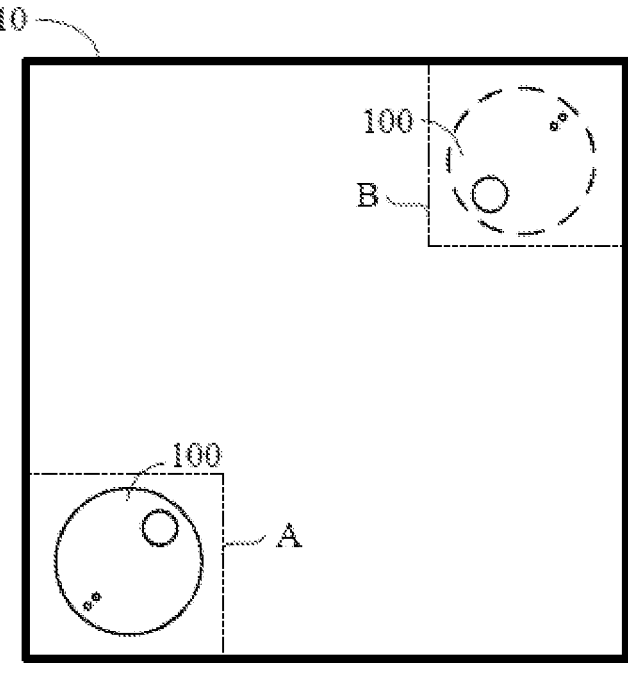
FIG. 1 is a schematic diagram when a hijacking event occurs on a robot according to an example embodiment.

FIG. 1 is a schematic diagram when a hijacking event occurs on a sweeping robot according to an example embodiment. As shown in FIG. 1, a sweeping robot 100 is performing a cleaning operation in square environment 10, and if the sweeping robot 100 is moved from location A to location B (that is, a hijacking event occurs on the sweeping robot 100), the sweeping robot 100 cannot determine, based on LDS, that a hijacking event occurs on the sweeping robot 100 itself (because location A and location B are similar in location data). Actually, instead of determining, based on LDS, that a hijacking event occurs on the sweeping robot 100 itself, the sweeping robot 100 determines that it is still at location A (actually at location B, that is, a relocation error), and thus the sweeping robot 100 still continues to perform the cleaning operation according to a cleaning policy (for example, a cleaning route used is unchanged) at location A. As a result, the cleaning efficiency is reduced.

The present disclosure improves the locating manner of the robot with an autonomous moving function, so as to resolve above technical problem in the related technology. Detailed description will be provided in the following in combination with embodiments of the present disclosure.

A robot 100 provided in the present disclosure can be, but is not limited to, an automatic cleaning device such as a sweeping robot, a mopping robot, or a sweeping-mopping robot. The robot 100 may include a main body, a sensing system, a control system, a drive system, a cleaning system, an energy system, and a huhuman-machine interaction system.

The main body includes a forward part and a backward part, and has an approximately circular shape (being of the circular shape in both the forward and backward parts). The main body may also have other shapes, including but is not limited to an approximately D shape with a rectangular forward part and a circular backward part.

The sensing system includes a location determination device located on the top of the main body, and sensor devices such as a buffer, a cliff sensor and an ultrasonic sensor which are located in the forward part of the main body, an infrared sensor, a magnetometer, an accelerometer, a gyroscope, an odograph, etc. The sensing system provides to the control system various location information and motion state information of the robot. The location determination device includes but is not limited to a camera and a laser distance sensor (LDS). The laser distance sensor using a triangular ranging method is taken as an example in the following to describe how to determine a location. A basic principle of the triangular ranging method is based on an equal-ratio relationship of similar triangles, which will not be described in detail herein.

The laser distance sensor includes a light emitting unit and a light receiving unit. The light emitting unit may include a light source that emits light. The light source may include a light emitting element, such as an infrared or a visible light emitting diode (LED) that emits infrared light or visible light. In some embodiments, the light source may be a light emitting element that emits a laser beam. A laser diode (LD) is taken as an example of the light source in the present disclosure. The light source that uses the laser beam can achieve more accurate measurement than other light due to monochromatic, directional, and collimation features of the laser beam. For example, compared with the laser beam, infrared or visible light emitted by the light emitting diode (LED) may be affected by ambient factors (for example, color or texture of an object), and the measurement accuracy may be reduced. The laser diode (LD) may be a point laser that measures two-dimensional location information of an obstacle, or may be a line laser that measures three-dimensional location information in a specific range of the obstacle.

The light receiving unit may include an image sensor, and a light spot reflected or scattered by an obstacle is formed on the image sensor. The image sensor may be a set of multiple unit pixels in a single row or in multiple rows. These light receiving elements can convert an optical signal into an electrical signal. The image sensor may be a complementary metal oxide semiconductor (CMOS) sensor or a charge coupled device (CCD) sensor. The complementary metal oxide semiconductor (CMOS) sensor is preferred due to a cost advantage. In addition, the light receiving unit may include a light receiving lens component. The light reflected or scattered by the obstacle may travel through the light receiving lens component to form an image on the image sensor. The light receiving lens component may include a single lens or multiple lenses.

A base may be used to support the light emitting unit and the light receiving unit, and the light emitting unit and the light receiving unit are arranged on the base at a specific distance from each other. To obtain measurement of an obstacle around the robot in a 360-degree direction, the base may be rotatably arranged on the body. Alternatively, the base is not rotatable, and the emitted light and the received light are rotated by arranging a rotating element. A rotational angular velocity of the rotating element may be obtained by setting an optical coupler element and a coded disc. The optical coupler element senses a teeth notch on the coded disc, and an instant angular velocity can be obtained by performing division between slip time of a distance between teeth notches and the distance between teeth notches. The greater the density of the teeth notch on the coded disc is, the higher the measurement accuracy and precision are, the finer the structure is, and the larger the calculation amount reaches. On the contrary, the smaller the density of the teeth notch is, the lower the measurement accuracy and precision are, the simpler the structure is, and the smaller the calculation amount reaches, which may reduce some costs.

A data processing apparatus, such as a DSP, connected to the light receiving unit, records distance values of obstacles at all angles in a direction at 0-degree angular relative to the robot, and transmits the distance values to a data processing unit in the control system, such as an application processor (AP) including a CPU. The CPU runs a particle filtering based locating algorithm to obtain a current location of the robot, and draws a map according to the location for navigation. The locating algorithm preferably uses simultaneous location and mapping (SLAM).

Although the laser distance sensor based on the triangular ranging method may measure an infinite distance beyond a certain distance in principle, an actual remote measurement, for example, more than six meters, is difficult to implement. This is mainly because a size of a pixel unit on a sensor of the light receiving unit is limited, and a measured value is also affected by a photoelectric conversion speed of the sensor, a data transmission speed between the sensor and a connected DSP, and a calculation speed of the DSP. After being affected by a temperature, the measured value obtained by the laser distance sensor would also cause a change to the system that cannot be tolerated. This is mainly because thermal expansion deformation of a structure between the light emitting unit and the light receiving unit causes an angle change between incident light and emergent light, and a temperature drift may also exist between the light emitting unit and the light receiving unit. After the laser distance sensor has been used for a long time, deformation caused by accumulation of multiple factors such as temperature changes and vibration may also seriously affect a measurement result. The accuracy of the measurement result directly determines the accuracy of the map depicted, which is a basis for further policy implementation of the robot and is especially important.

The forward part of the main body may carry a buffer. When a drive wheel module pushes the robot to move on the ground in a cleaning process, the buffer detects one or more events (or objects) in a traveling path of the robot 100 by using the sensor system, such as an infrared sensor, and the robot may control the drive wheel module, based on events (or objects) detected by the buffer, such as an obstacle or a wall, to cause the robot to respond to the events (or objects), such as keeping away from the obstacle.

The control system is arranged on a circuit board in the main body, and includes computing processor in communication with a non-temporary memory, such as a hard disk, a flash memory, and a random access memory, for example, a central processing unit and an application processor. The application processor depicts an instant map of the environment in which the robot is located using a locating algorithm, such as SLAM, according to obstacle information fed back by the laser distance sensor. In addition, the application processor determines in which working state the sweeping robot is located currently comprehensively in combination with distance information and speed information that are fed back by sensor devices such as the buffer, the cliff sensor, the ultrasonic sensor, the infrared sensor, the magnetometer, the accelerometer, the gyroscope, and the odograph. For example, the sweeping robot is crossing a doorsill, moving onto a carpet, standing at a cliff, stuck at the top or bottom, picked up, or a dust box of the sweeping robot is full. In addition, the application processor would give a specific policy for next action for different cases, so that the action of the robot meets a requirement of the owner and provides better user experience. The control system can plan a most efficient and reasonable sweeping path and a sweeping manner based on the instant map information depicted by the SLAM, thereby greatly improving sweeping efficiency of the robot.

The drive system can operate the robot 100 to travel across the ground based on a drive command containing distance and angle information (for example, x, y, and θ components). The drive system includes the drive wheel module. The drive wheel module can control both the left wheel and the right wheel. In order to control movement of the robot more accurately, the drive wheel module preferably includes a left drive wheel module and a right drive wheel module. The left and right drive wheel modules are arranged oppositely along a lateral axis defined by the main body. To enable the robot to move more stably or more strongly on the ground, the robot may include one or more driven wheels. The driven wheel includes but is not limited to a universal wheel. The drive wheel module includes a road wheel, a drive motor, and a control circuit for controlling the drive motor. The drive wheel module may be further connected with a circuit for measuring a drive current and an odograph. The drive wheel module may be detachably connected to the main body, so as to facilitate disassembly and maintenance. The drive wheel may have an offset drop suspension system, which is secured in a moveable manner, for example, attached to the main body of the robot in a rotatable manner, and receives a spring offset directing downward and away from the main body of the robot. The spring offset allows the drive wheel to maintain traction and contact with the ground with a certain landing force, and a cleaning element of the robot 100 also contacts the ground 10 with a certain pressure.

The cleaning system may be a dry cleaning system and/or a wet cleaning system. A main cleaning function of the dry cleaning system is determined from a cleaning system formed by a roller brush structure, a dust box structure, a fan structure, an air outlet, and a connection part between the four. The roller brush structure that interferes with the ground sweeps the rubbish on the ground and rolls it to the front of a suction inlet between the roller brush structure and the dust box structure. Then, the rubbish is drawn into the dust box structure by the suction gas generated by the fan structure and passing through the dust box structure. The dust removal capacity of the sweeping robot can be characterized by dust pick up efficiency (DPU). The dust pick up efficiency DPU is affected by the roller brush structure and material, affected by a wind utilization rate of the air duct formed by the suction inlet, the dust box structure, the fan structure, the air outlet and a connection part between the four, and affected by the type and the power of the fan. The dust pick up efficiency DPU is a complex issue in system design. The enhancement in the dust removal capacity is more meaningful for an energy-limited cleaning robot than for ordinary plug-in cleaners. The enhancement in the dust removal capacity directly effectively reduces the requirement for energy. That is, a machine that can clean 80 square meters of ground through one charging can grow into a machine that can clean 180 square meters or more by charging only once. In addition, a service life of a battery would also greatly increases by reducing number of times for charging, and the frequency of replacing the battery by the user would be reduced. More intuitively and importantly, the enhancement in the dust removal capacity is most obvious and important user experience to users. The user directly draws a conclusion whether it is a clean sweeping or mopping. The dry cleaning system may further include a side brush having a rotation shaft at a certain angle relative to the ground, to move debris into a roller brush region of the cleaning system.

The energy system includes a charging battery, such as a Ni-MH battery and a lithium battery. The charging battery may be connected with a charging control circuit, a charging temperature detection circuit of a battery pack, and an under-voltage monitoring circuit of a battery. The charging control circuit, the charging temperature detection circuit of the battery pack, and the under-voltage monitoring circuit of the battery are connected to a single-chip microcomputer control circuit. The robot is charged by connecting to a charging station through a charging electrode disposed on a side of or below the main body.

The human-machine interaction system includes a button on a host panel. The button is used by the user to select a function. The human-machine interaction system may further include a display screen and/or an indicator lamp and/or a speaker, where the display screen, the indicator lamp, and the speaker display to the user a current state of the machine or a function selection item. The human-machine interaction system may further include a client program for a mobile phone. For a path navigation cleaning device, a mobile phone client can display to the user a map of the environment in which the machine is located and a location of the machine, so as to provide a more abundant and humanized function item to the user.

The robot provided in the present disclosure is configured with an image collection unit and a ranging unit. The image collection unit is configured to collect image data, and the ranging unit is configured to collect ranging data. The image collection unit and the ranging unit may be included in above location determination device of the sensing system. For example, the image collection unit may be a camera, and the ranging unit may be a laser distance sensor. For another example, the image collection unit and the ranging unit may be integrated into a camera. For example, a TrueDepth camera that has a time of flight (TOF) function may be used, or a camera that adopts a 3D structured light technology is used. Specific hardware of the image collection unit and the ranging unit are not limited in the present disclosure.

Figure 2:
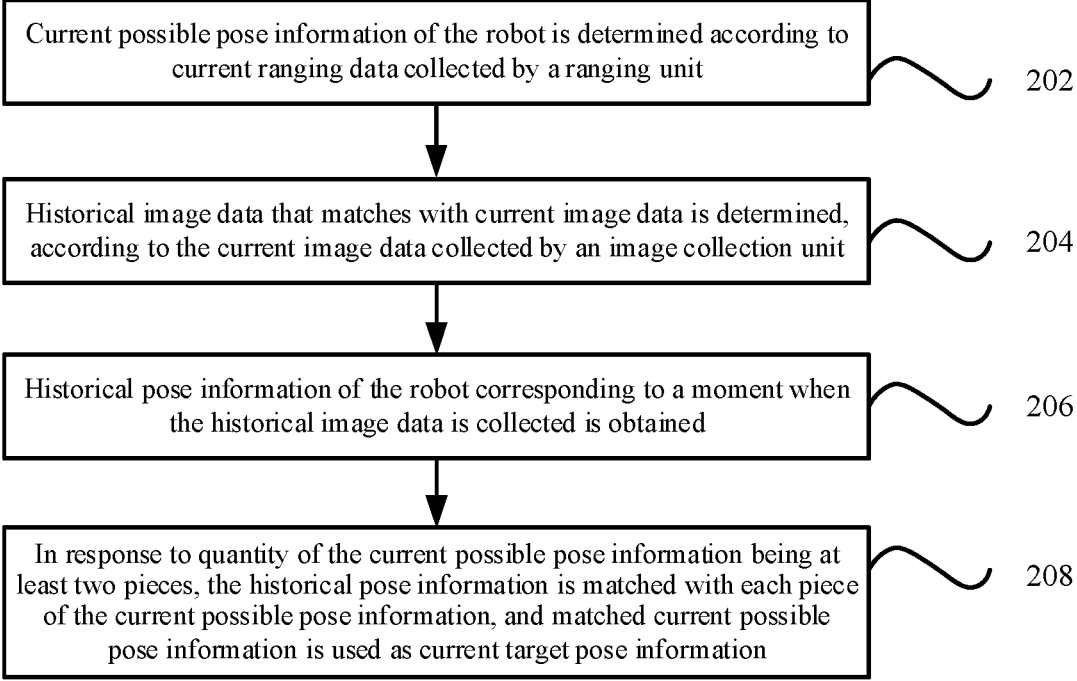
FIG. 2 is a flowchart of a locating method for a robot according to an example embodiment.

Based on the structure of the robot described above, the present disclosure provides a locating method for a robot. As shown in FIG. 2, the method may include the following steps.

In step 202, current possible pose information of the robot is determined according to current ranging data collected by a ranging unit.

In some embodiments, the current possible pose information of the robot may be determined according to the ranging data and current orientation information of the robot. An automatic cleaning device equipped with an LDS is taken as an example. The automatic cleaning device uses the ranging data collected by the LDS to generate by using the SLAM algorithm, a map of the environment in which a cleaning operation is performed, and determines current location information of the automatic cleaning device in the map, while collecting current orientation information of the automatic cleaning device itself by using other sensor devices (for example, a gyroscope, an accelerometer, and an electronic compass, and the like), and then determining current possible pose information according to the location information and the orientation information.

In step 204, historical image data that matches with current image data is determined, according to the current image data collected by an image collection unit, and the historical image data is collected by the image collection unit at a historical moment.

In some embodiments, the image data collected at the "historical moment" can be understood as image data collected by the robot in a previous (before "current" in a time sequence) moving process (the robot moves in a travelling process). The automatic cleaning device is taken as an example (which in some embodiments is not limited to the automatic cleaning device, but may also be any robot having an autonomous moving function), and the image data collected by the automatic cleaning device in the first cleaning process may be used as the historical image data. Alternatively, the image data collected by the automatic cleaning device before the current cleaning process (that is, a historical cleaning process) is used as the historical image data. It should be noted that the locating method of the present disclosure is for a case where the automatic cleaning device performs cleaning in the same environment.

In some embodiments, "matched" may be understood as similarity (or matching degree) between the current image data and the historical image data exceeds a threshold. In some other embodiments, "matched" may be understood as that both the current image data and the historical image data include one or more same photographed objects.

In step 206, historical pose information of the robot corresponding to a moment when the historical image data is collected is obtained.

In some embodiments, when collecting image data in the moving process, the robot records the pose information of itself at the moment, and establishes a mapping relationship between the image data and the pose information. The pose information may include parameters, such as a distance and an angle between the robot and the photographed object, and the posture of the robot, etc., that can describe a relative location between the robot and the photographed object (that is, an object photographed by the image collection unit, and the image collection unit obtains image data of the photographed object by taking photos of the photographed object). The automatic cleaning device equipped with an LDS and a camera (that is, the LDS is used as the ranging unit and the camera is used as the image collection unit) is taken as an example, the camera and the LDS are operated simultaneously to collect corresponding data. For example, in the cleaning process at a "historical moment", the automatic cleaning device collects the image data by using the camera, while using the ranging data collected by the LDS, generating by using the SLAM algorithm a map of the environment in which a cleaning operation is performed, and determining the current location information of itself in the map, and meanwhile, collecting the current orientation information of the automatic cleaning device through other sensor devices (for example, a gyroscope, an accelerometer, and an electronic compass, and the like) and then determining the pose information according to the location information and the orientation information.

It should be noted that, based on foregoing description of "matched", there would be multiple pieces of image data that can match with some piece of image data, and the multiple pieces of image data correspond to different angles, locations, orientations, and the like. For example, in the cleaning process, the automatic cleaning device may photograph the same tea table at different angles, distances, and orientations.

In step 208: in response to quantity of the current possible pose information being at least two pieces, the historical pose information is matched with each piece of the current possible pose information, and matched current possible pose information is used as current target pose information.

In some embodiments, in the moving process, the robot can collect the image data by using the image collection unit, and establish the mapping relationship between the pose information corresponding to the moment when the image data is collected and the image data. On this basis, when the quantity of the current possible pose information of the robot is at least two pieces, matching can be performed, in the subsequent moving process of the robot, between the historical pose information corresponding to the historical image data that matches with the current image data and each piece of the current possible pose information, and the matched current possible pose information is used as the current target pose information. Therefore, the current target pose information of the robot can be accurately determined. Further, the current location of the robot may be determined according to the current target pose information, so as to improve locating accuracy of the robot, and further improve working efficiency of the robot.

According to above step 204, the historical image data that matches with the current image data may include multiple pieces of image data. In other words, the historical pose information obtained in step 206 may also include multiple pieces of pose information. Therefore, in step 208, that the historical pose information is matched with each piece of the current possible pose information can also be understood as matching each piece of the historical pose information with each piece of the current possible pose information. In some embodiments, when the current possible pose information does not match with any piece of the historical pose information, it can be determined that there is an error in the current pose information.

For a condition for determining that a hijacking event occurs on the robot, reference can be made to the data collected by the image collection unit and the ranging unit the robot equipped. For example, when a hijacking event occurs on the robot, the image data collected by the image collection unit will change suddenly, and the ranging data collected by the ranging unit will also change suddenly. Therefore, in some example embodiments, when the image data collected by the image collection unit and/or the ranging data collected by the ranging unit change(s) suddenly, it may be determined that a hijacking event occurs on the robot. According to embodiments of the present disclosure, accurate detection of the hijacking event can be achieved by adding the change of the image data collected by the image collection unit to a basis for determining whether a hijacking event occurs on the robot, thereby facilitating subsequent relocation.

Figure 3A:
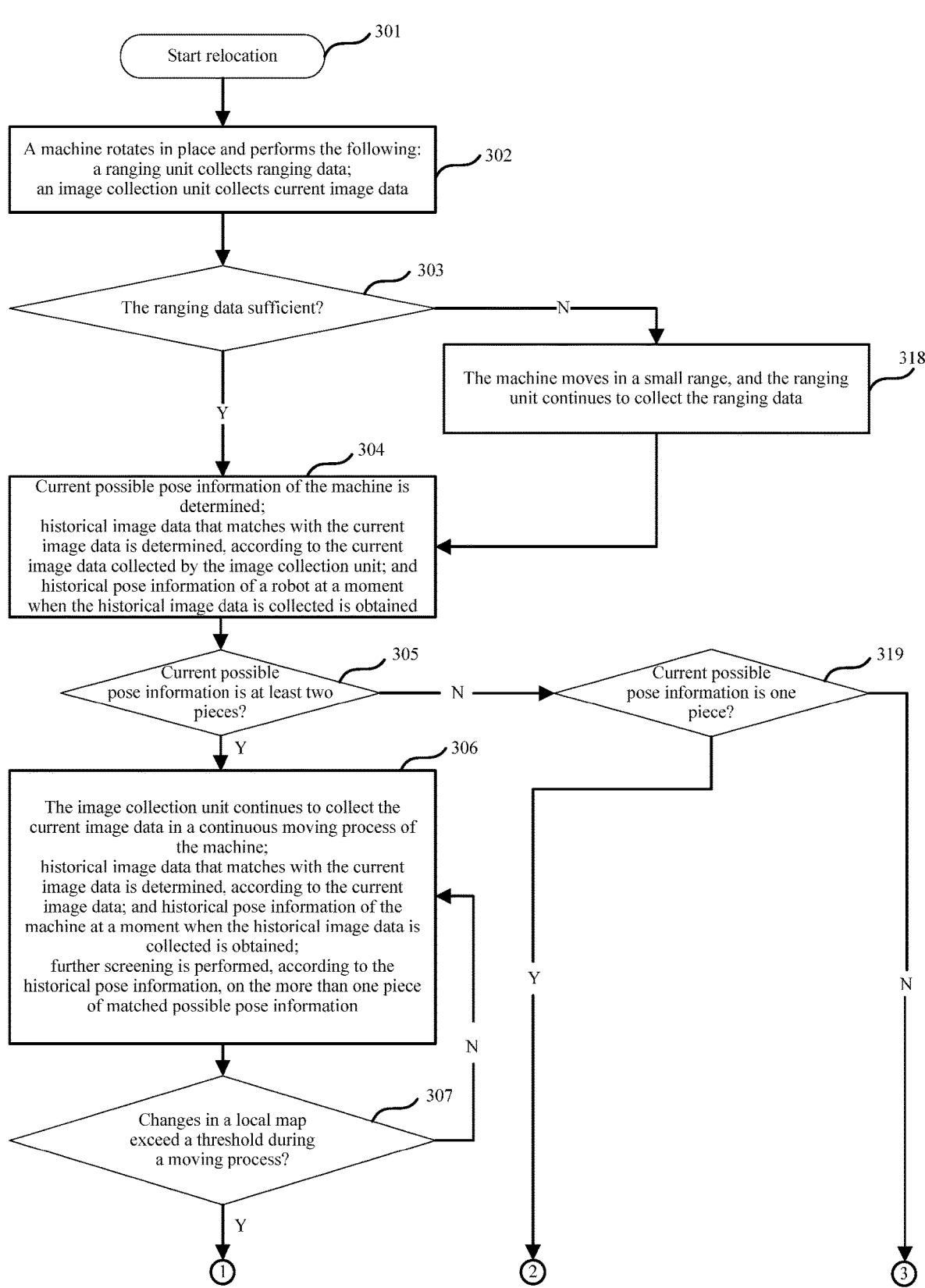
FIGS. 3A and 3B are a flowchart of a locating method for a robot according to another example embodiment.
Figure 3B:
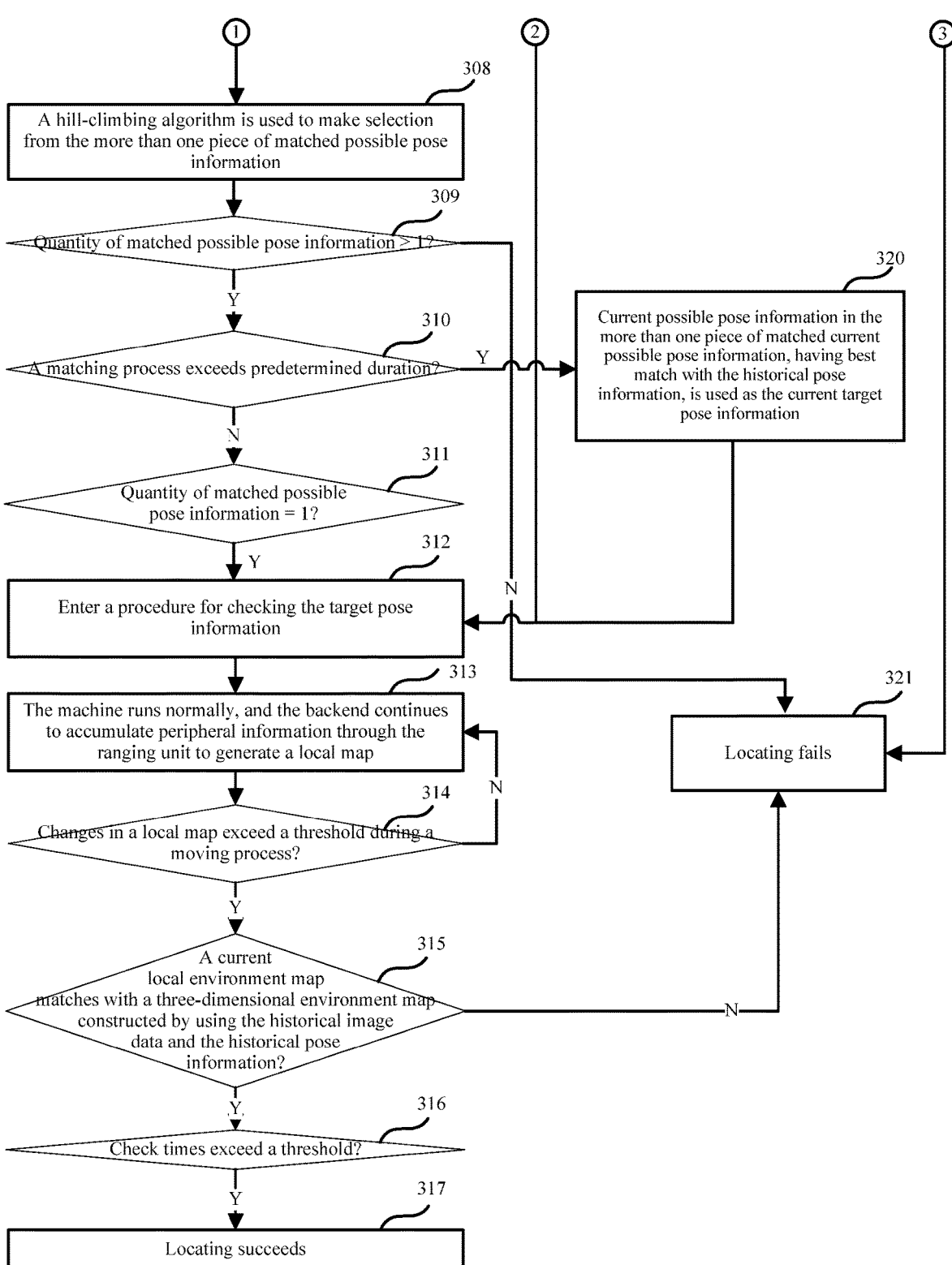

Referring to FIGS. 3A and 3B, the method may further include following operations.

In step 301, relocation starts.

In step 302, A machine rotates in place and performs the following: a ranging unit collects ranging data, and an image collection unit collects current image data.

In step 303, whether the ranging data is sufficient is determined. If a determination result is "YES", goes to step 304, if not, goes to step 318.

In step 304, current possible pose information of the machine is determined, historical image data that matches with the current image data is determined according to the current image data collected by the image collection unit, and historical pose information of a robot at a moment when the historical image data is collected is obtained.

In step 305, whether the current possible pose information is at least two pieces is determined. If a determination result is "YES", goes to step 306, if not, goes to step 319.

In step 306, the image collection unit continues to collect the current image data in a continuous moving process of the machine. Historical image data that matches with the current image data is determined according to the current image data, and historical pose information of the machine at a moment when the historical image data is collected is obtained. Further screening is performed, according to the historical pose information, on the more than one piece of matched possible pose information.

In step 307, whether changes in a local map exceed a threshold during a moving process is determined. If a determination result is "YES", goes to step 308, if not, goes back to step 306.

In step 308, a hill-climbing algorithm is used to make selection from the more than one piece of matched possible pose information.

In step 309, whether quantity of matched possible pose information is greater than or equal to 1 is determined. If a determination result is "YES", goes to step 310, if not, goes to step 321.

In step 310, whether a matching process exceeds predetermined duration is determined. If a determination result is "YES", goes to step 320, if not, goes to step 311.

In step 311, whether quantity of matched possible pose information equals to 1 is determined. If a determination result is "YES", goes to step 312.

In step 312, a procedure for checking the target pose information starts.

In step 313, the machine runs normally, and the backend continues to accumulate peripheral information through the ranging unit to generate a local map.

In step 314, whether changes in a local map exceed a threshold during a moving process is determined. If a determination result is "YES", goes to step 315, if not, goes back to step 313.

In step 315, whether a current local environment map matches with a three-dimensional environment map constructed by using the historical image data and the historical pose information is determined. If a determination result is "YES", goes to step 316, if not, goes to step 321.

In step 316, whether check times exceed a threshold is determined. If a determination result is "YES", goes to step 317.

In step 317, the locating succeeds.

In step 318, the machine moves in a small range, and the ranging unit continues to collect the ranging data.

In step 319, whether current possible pose information is one piece is determined. If a determination result is "YES", goes to step 312, if not, goes to step 321.

In step 320, current possible pose information in the more than one piece of matched current possible pose information, having best match with the historical pose information, is used as the current target pose information.

In step 321, the locating fails.

In some embodiments, the image collection unit continues to collect current image data in the continuous moving process of the robot when the matched current possible pose information is more than one piece. Historical image data that matches with the current image data is determined according to the current image data. Historical pose information of the robot corresponding to a moment when the historical image data is collected is obtained. Further screening is performed on the more than one piece of matched possible pose information according to the historical pose information.

In some embodiments, a hill-climbing algorithm may be used to perform screening on the more than one piece of matched possible pose information, until one piece of current possible pose information is selected as the target pose information.

In some embodiments, if duration for screening each piece of the current possible pose information according to the historical pose information exceeds predetermined duration, current possible pose information in the more than one piece of matched current possible pose information, having best match with the historical pose information, is used as the current target pose information.

In some embodiments, after the current target pose information is extracted, the method may enter a step of checking the target pose information. The step of checking the target pose information includes following operations. A current local environment map is obtained according to the current ranging data collected by the ranging unit, and if the current local environment map matches with a three-dimensional environment map constructed by using the historical image data and the historical pose information, it is determined that the current target pose information is accurate.

According to embodiments of the present disclosure, the location of the robot may be further determined according to current target location information.

Figure 4:
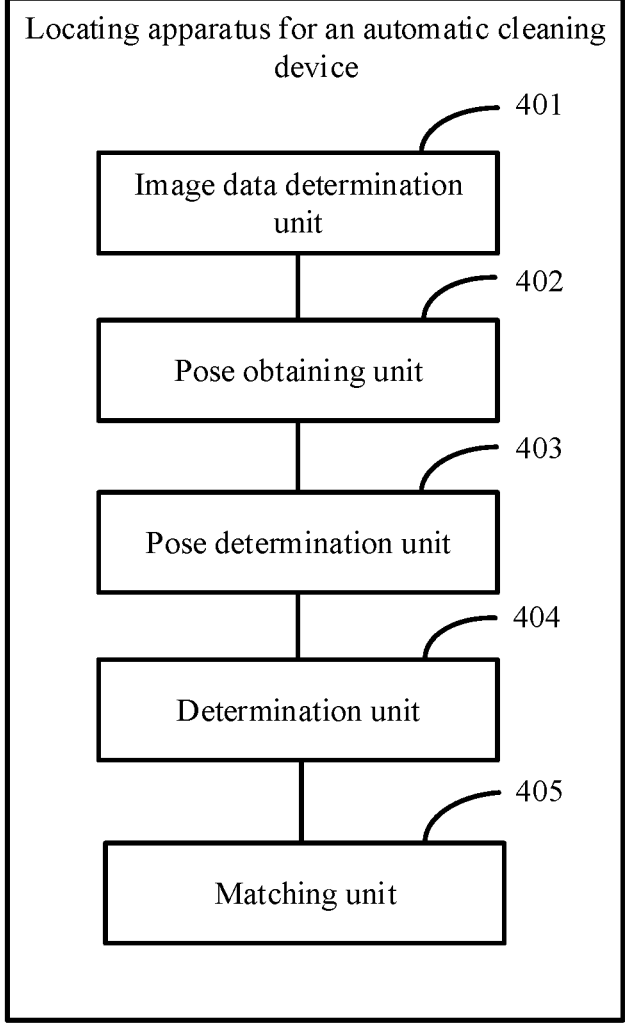
FIG. 4 is a block diagram of a locating apparatus for a robot according to an example embodiment.

FIG. 4 is a block diagram of a locating apparatus for a robot according to an example embodiment. Referring to FIG. 4, the robot is equipped with an image collection unit and a ranging unit. The apparatus includes an image data determination unit 401, a pose obtaining unit 402, a pose determination unit 403, a determination unit 404, and a matching unit 405.

The image data determination unit 401 is configured to determine, according to current image data collected by the image collection unit, historical image data that matches with the current image data, the historical image data herein being collected by the image collection unit at a historical moment. The pose obtaining unit 402 is configured to obtain historical pose information of the robot corresponding to a moment when the historical image data is collected. The pose determination unit 403 is configured to determine current possible pose information of the robot according to current ranging data collected by the ranging unit. The determination unit 404 is configured to determine quantity of the current possible pose information. The matching unit 405 is configured to match the historical pose information with each piece of the current possible pose information, and use matched current possible pose information as current target pose information.

In some embodiments, the locating apparatus may further include a locating unit, which is configured to determine a current location of the robot according to the current target pose information.

In some embodiments, the locating apparatus may further include a hijacking event determination unit, which is configured to determine whether a hijacking event occurs on the robot. The locating unit may include a first locating subunit, which is configured to when it is determined that a hijacking event occurs on the robot, determine, according to the current ranging data collected by the ranging unit, current possible pose information of the robot after the hijacking event occurs.

In some embodiments, the locating apparatus may further include an environment obtaining unit, a checking unit and a judgment unit. The environment obtaining unit is configured to obtain a current local environment map according to the current ranging data collected by the ranging unit. The checking unit is configured to check whether the current local environment map matches with a three-dimensional environment map constructed by using the historical image data and the historical pose information. The judgment unit is configured to determine that the current target pose information is accurate when the current local environment map matches with the three-dimensional environment map constructed by using the historical image data and the historical pose information.

Specific implementations of the modules of the apparatus in above embodiments have been described in detail in method embodiments, and thus detailed description of which will not be provided herein.

The apparatus embodiments correspond to the method embodiments, and thus for related parts of the apparatus, references can be made to descriptions in the method embodiments. The apparatus embodiments described above are merely examples. The units described as separate parts can or cannot be physically separate, and the parts displayed as units can or cannot be physical units. That is, the parts can be located at one location, or can be distributed on a plurality of network units. Some or all of the modules can be selected to achieve the purpose of solutions of the present disclosure, depending on actual requirements. A person of ordinary skill in the art can understand and implement embodiments of the present disclosure without creative efforts.

In some embodiments, the present disclosure further provides a robot. The robot is equipped with an image collection unit and a ranging unit. The robot further includes a processor and a memory configured to store executable instructions for the processor. The processor executes the executable instructions to implement the locating method for the robot according to any of foregoing embodiments. For example, the method may include, determining current possible pose information of the robot according to current ranging data collected by the ranging unit; determining, according to current image data collected by the image collection unit, historical image data that matches with the current image data, wherein the historical image data is collected by the image collection unit at a historical moment; obtaining historical pose information of the robot corresponding to a moment when the historical image data is collected; and matching, in response to quantity of the current possible pose information being at least two pieces, the historical pose information with each piece of the current possible pose information, and using matched current possible pose information as current target pose information.

In some embodiments, the present disclosure further provides a terminal. The terminal includes a memory and one or more programs. The one or more programs are stored in the memory. The one or more programs are configured to be executed by one or more processors. The one or more programs include instructions used to implement the locating method for the robot according to any of foregoing embodiments. For example, the method may include, determining current possible pose information of the robot according to current ranging data collected by the ranging unit; determining, according to current image data collected by the image collection unit, historical image data that matches with the current image data, wherein the historical image data is collected by the image collection unit at a historical moment; obtaining historical pose information of the robot corresponding to a moment when the historical image data is collected; and matching, in response to quantity of the current possible pose information being at least two pieces, the historical pose information with each piece of the current possible pose information, and using matched current possible pose information as current target pose information.

Figure 5:
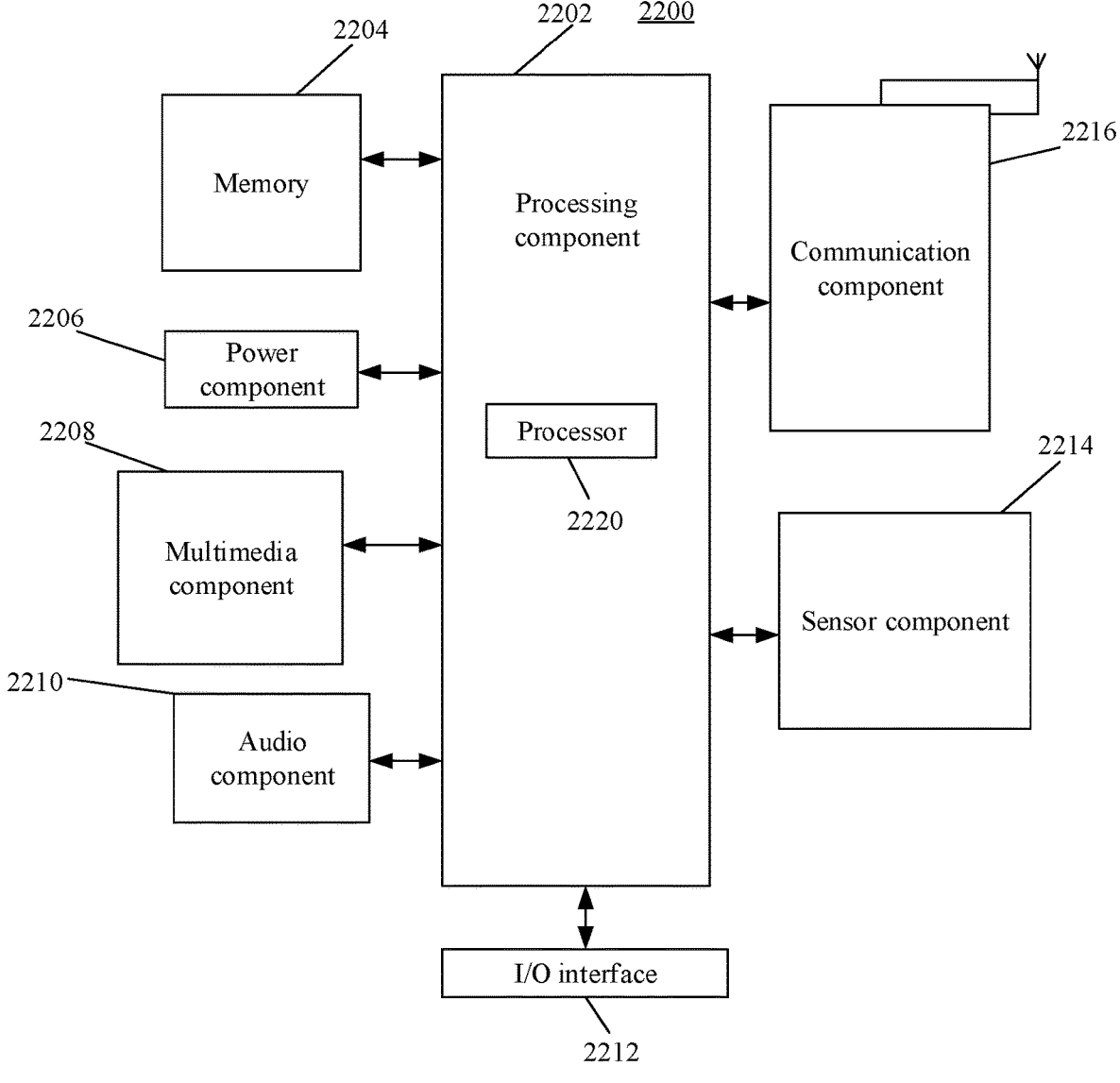
FIG. 5 is a block diagram of a locating device 2200 for a robot according to an example embodiment.

FIG. 5 is a block diagram of a locating device 2200 for a robot according to an example embodiment. For example, the device 2200 may be a mobile phone, a computer, a digital broadcast terminal, a message transceiver, a game console, a tablet, medical equipment, fitness equipment, a personal digital assistant, or the like.

Referring to FIG. 5, the device 2200 may include one or more of the following components: a processing component 2202, a memory 2204, a power component 2206, a multimedia component 2208, an audio component 2210, an input/output (I/O) interface 2212, a sensor component 2214, and a communication component 2216.

The processing component 2202 typically controls the overall operation of the device 2200, such as an operation associated with display, telephone calls, data communication, camera operations, and recording operations. The processing component 2202 may include one or more processors 2220 for executing instructions to complete all or some of above steps of the method described above. In addition, the processing component 2202 may include one or more modules to facilitate interaction between the processing component 2202 and other components. For example, the processing component 2202 may include a multimedia module to facilitate interaction between the multimedia component 2208 and the processing component 2202.

The memory 2204 is configured to store various types of data to support operations in the device 2200. Examples of such data include instructions, contact data, phone book data, messages, pictures, videos, and the like for any application or method that are performed on the device 2200. The memory 2204 may be implemented by any type of volatile or non-volatile storage device or a combination thereof, for example, a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk, or an optical disk.

The power component 2206 provides power for various components of the device 2200. The power component 2206 may include a power management system, one or more power supplies, and other components associated with generation, management, and distribution of electric power for the device 2200.

The multimedia component 2208 includes a display screen that provides an output interface between the device 2200 and a user. In some embodiments, the display screen may include a liquid crystal display (LCD) and a touch panel (TP). If the display screen includes a touch panel, the display screen may be implemented as a touchscreen to receive an input signal from the user. The touch panel includes one or more touch sensors to sense touch, slide, and gestures on the touch panel. The touch sensor may not only sense a boundary of a touch or slide action, but also detect duration and pressure associated with the touch or slide operation. In some embodiments, the multimedia component 2208 includes a front camera and/or a rear camera. When the device 2200 is in an operating mode, such as a shooting mode or a video mode, the front camera and/or the rear camera may receive external multimedia data. Each of the front camera and the rear camera may be a fixed optical lens system or have focal length and optical zoom capability.

The audio component 2210 is configured to output and/or input an audio signal. For example, the audio component 2210 includes a microphone (MIC). When the device 2200 is in an operation mode, such as a calling mode, a recording mode, and a voice recognition mode, the microphone is configured to receive an external audio signal. The received audio signal may be further stored in the memory 2204 or transmitted via the communication component 2216. In some embodiments, the audio component 2210 further includes a speaker configured to output an audio signal.

The I/O interface 2212 provides an interface between the processing component 2202 and a peripheral interface module, which can be a keyboard, a click wheel, a button, and the like. These buttons may include, but are not limited to, a Home button, a Volume button, a Start button, and a Lock button.

The sensor component 2214 includes one or more sensors configured to provide various aspects of condition evaluation for the device 2200. For example, the sensor component 2214 may detect an on/off state of the device 2200, relative locating of the component. For example, the component is a display and a keypad of the device 2200. The sensor component 2214 may further detect changes in a location of the device 2200 or a component of the device 2200, presence or absence of user's contact with the device 2200, orientation or acceleration/deceleration of the device 2200, and a temperature change of the device 2200. The sensor component 2214 may include a proximity sensor configured to detect presence of a nearby object without any physical contact. The sensor component 2214 may further include a light sensor, such as a CMOS or CCD image sensor, for use in an imaging application. In some embodiments, the sensor component 2214 may further include an acceleration sensor, a gyroscope sensor, a magnetic sensor, a pressure sensor, or a temperature sensor.

The communication component 2216 is configured to facilitate wired or wireless communication between the device 2200 and other devices. The device 2200 may access a wireless network based on a communication standard, such as Wi-Fi, 2G or 3G, or a combination thereof. In some example embodiments, the communication component 2216 receives broadcast signals or broadcast-related information from an external broadcast management system through a broadcast channel. In some example embodiments, the communication component 2216 further includes a near field communication (NFC) module to facilitate short-range communication. For example, the NFC module may be implemented based on the radio frequency identification (RFID) technology, the infrared data association (IrDA) technology, the ultra wideband (UWB) technology, the Bluetooth (BT) technology, and other technologies.

In some example embodiments, the device 2200 may be implemented through one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, to perform above methods.

In some example embodiments, a non-temporary computer-readable storage medium including instructions is further provided, such as the memory 2204 including instructions, and the instructions can be executed by the processor 2220 of the device 2200 to complete the method. For example, the non-transitory computer-readable storage medium may be a ROM, a random access memory (RAM), a CD-ROM, a magnetic tape, a floppy disk, an optical data storage device, and the like.

Other embodiments of the present disclosure will readily occur to those skilled in the art upon consideration of the specification and practice of embodiments disclosed herein. The present disclosure is intended to cover any variations, functions, or adaptations of the present disclosure that follow the general principles of the present disclosure, and include common knowledge or techniques in the technical field not disclosed by the present disclosure. The specification and the embodiments are to be regarded as examples only, with the true scope and spirit of the present disclosure being indicated by the appended claims.

It should be understood that the present disclosure is not limited to the precise structures already described above and illustrated in the accompanying drawings, and various modifications and changes can be made without departing from the scope thereof. The scope of the present disclosure is defined only by the appended claims.

What is claimed is:

1. A locating method for a robot, wherein the robot is equipped with an image collection unit and a ranging unit, the method comprising:

determining, according to current ranging data collected by the ranging unit and current orientation information of the robot, current possible pose information of the robot;

determining, according to first current image data collected by the image collection unit, first historical image data that matches with the first current image data, wherein the first historical image data is collected by the image collection unit at a historical moment;

obtaining first historical pose information of the robot at a moment when the first historical image data is collected; and matching, in response to quantity of the current possible pose information being at least two pieces, the first historical pose information with each piece of the current possible pose information, and using matched current possible pose information as current target pose information.

2. The method according to claim 1, further comprising:

determining, according to the current target pose information, a current location of the robot.

3. The method according to claim 1, further comprising:

collecting, by the image collection unit, second current image data when the matched current possible pose information is more than one piece;

determining, according to the second current image data, second historical image data that matches with the second current image data, wherein the second historical image data is collected by the image collection unit at a historical moment;

obtaining second historical pose information of the robot at a moment when the second historical image data is collected; and performing, according to the second historical pose information, further screening on the more than one piece of matched current possible pose information.

4. The method according to claim 3, further comprising:

performing, by using a hill-climbing algorithm, screening on the more than one piece of matched current possible pose information, until one piece of the current possible pose information is selected as the target pose information.

5. The method according to claim 3, wherein in response to duration for screening exceeding predetermined duration when performing, according to the second historical pose information, screening on each piece of the current possible pose information, using current possible pose information in the more than one piece of matched current possible pose information, having best match with the second historical pose information, as the current target pose information.

6. The method according to claim 1, further comprising:

checking the current target pose information by:

obtaining, according to the current ranging data, a current local environment map, and determining, in response to matching between the current local environment map and a three-dimensional environment map constructed by using the first historical image data and the first historical pose information, that the current target pose information is accurate.

7. The method according to claim 1, further comprising:

collecting the current orientation information of the robot by using a sensor device.

8. The method according to claim 1, wherein matching between the first current image data and the first historical image data comprises at least one of:

similarity between the first current image data and the first historical image data exceeding a first threshold; and both the first current image data and the first historical image data comprising one or more same photographed objects.

9. The method according to claim 1, wherein obtaining the first historical pose information of the robot according to a mapping relationship between image data and pose information.

10. The method according to claim 1, wherein similarity between each piece of the matched current possible pose information and the first historical pose information exceeds a second threshold.

11. A robot, equipped with an image collection unit and a ranging unit, comprising:

a processor; and a memory configured to store executable instructions for the processor;

wherein the processor is configured to:

determine, according to current ranging data collected by the ranging unit and current orientation information of the robot, current possible pose information of the robot;

determine, according to first current image data collected by the image collection unit, first historical image data that matches with the first current image data, wherein the first historical image data is collected by the image collection unit at a historical moment;

obtain first historical pose information of the robot at a moment when the first historical image data is collected; and match, in response to quantity of the current possible pose information being at least two pieces, the first historical pose information with each piece of the current possible pose information, and use matched current possible pose information as current target pose information.

12. The robot according to claim 11, wherein the processor is further configured to:

determine, according to the current target pose information, a current location of the robot.

13. The robot according to claim 11, wherein the processor is further configured to:

collect, by the image collection unit, second current image data when the matched current possible pose information is more than one piece;

determine, according to the second current image data, second historical image data that matches with the second current image data, wherein the second historical image data is collected by the image collection unit at a historical moment;

obtain second historical pose information of the robot at a moment when the second historical image data is collected; and perform, according to the second historical pose information, further screening on the more than one piece of matched current possible pose information.

14. The robot according to claim 13, wherein the processor is further configured to:

perform, by using a hill-climbing algorithm, screening on the more than one piece of matched current possible pose information, until one piece of the current possible pose information is selected as the target pose information.

15. The robot according to claim 13, wherein the processor is further configured to:

in response to duration for screening exceeding predetermined duration when performing, according to the second historical pose information, screening on each piece of the current possible pose information, use current possible pose information in the more than one piece of matched current possible pose information, having best match with the second historical pose information, as the current target pose information.

16. The robot according to claim 11, wherein the processor is further configured to:

check the current target pose information by:

obtain, according to the current ranging data, a current local environment map, and determine, in response to matching between the current local environment map and a three-dimensional environment map constructed by using the first historical image data and the first historical pose information, that the current target pose information is accurate.

17. The robot according to claim 11, wherein the processor is further configured to:

collect the current orientation information of the robot by using a sensor device.

18. The robot according to claim 11, wherein matching between the first current image data and the first historical image data comprises at least one of:

similarity between the first current image data and the first historical image data exceeding a first threshold; and both the first current image data and the first historical image data comprising one or more same photographed objects.

19. The robot according to claim 11, wherein the processor is further configured to:

obtain the first historical pose information of the robot according to a mapping relationship between image data and pose information.

20. A non-transitory computer-readable storage medium having computer instructions stored thereon, which when executed by a processor, cause the processor to be configured to:

determine, according to current ranging data collected by the ranging unit and current orientation information of the robot, current possible pose information of the robot;

determine, according to first current image data collected by the image collection unit, first historical image data that matches with the first current image data, wherein the first historical image data is collected by the image collection unit at a historical moment;

obtain first historical pose information of the robot at a moment when the first historical image data is collected; and match, in response to quantity of the current possible pose information being at least two pieces, the first historical pose information with each piece of the current possible pose information, and use matched current possible pose information as current target pose information.

* * * * *